UNITED STATES PATENT OFFICE.

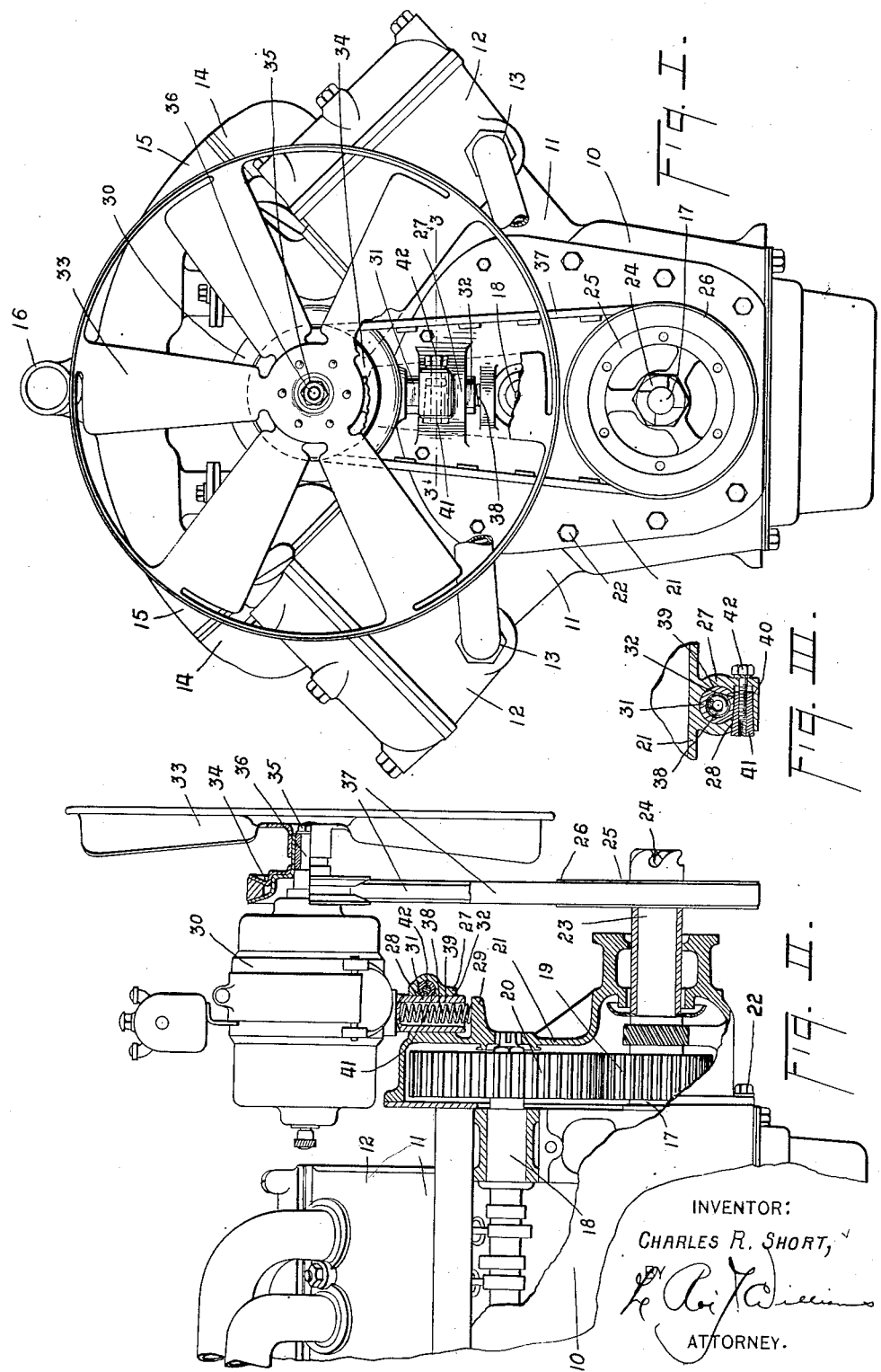

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

ACCESSORY-DRIVE FOR MOTOR-VEHICLES.

1,291,199.  Specification of Letters Patent.  Patented Jan. 14, 1919.

Application filed May 28, 1917. Serial No. 171,496.

*To all whom it may concern:*

Be it known that I, CHARLES R. SHORT, a subject of the King of Great Britain, and resident of Detroit, Wayne county, State of Michigan, have invented certain new and useful Improvements in Accessory - Drives for Motor-Vehicles, of which the following is a specification.

This invention relates to hydrocarbon motors, and more particularly to an improved mounting and driving connection for a device adapted to be driven thereby.

One of the objects of this invention is to provide an improved mounting and drive for a device or accessory of a hydrocarbon motor whereby the driving parts are maintained in a predetermined relation independently of any wear which occurs therein.

Another object of this invention is to provide a buoyant mounting for a device adapted to be driven by a hydrocarbon motor through a belt, whereby any looseness will be automatically taken up and a predetermined driving relation maintained.

Another object of this invention is to provide an improved mounting for an electrical machine and a cooling fan on a hydrocarbon motor, and to provide also a very novel and simple driving means therefor.

These and various other objects will more clearly appear from the following description, taken in connection with the accompanying drawings which form a part of this specification, and in which:

Figure 1 illustrates a front elevation of a V type hydrocarbon motor, embodying a preferred form of my invention;

Fig. 2 is a fragmentary side elevation of the front end of the hydrocarbon motor illustrated in Fig. 1, with certain portions broken away; and Fig. 3 is a horizontal transverse section, substantially on the line 3—3 of Fig. 1, showing the locking device for maintaining a fixed relation between the generator and the fan, and the cover on which they are supported.

Referring to the drawings, 10 is a motor crank case, having a pair of cylinder blocks 11, arranged thereon in V relation. Each block is provided with a cooling jacket 12 having an intake port 13, and an outlet port 14 which is adapted to be connected with a conduit 15 having a main discharge port 16. A crank shaft 17 and a cam shaft 18 are suitably mounted in the crank case and connected in driving relation through a pair of gears 19 and 20 which are respectively secured thereto, adjacent their forward ends. These gears are adapted to be housed by means of a cover 21 which is secured into position on the crank case as by bolts 22. The forward end of the crank shaft 17 is provided with an extension 23 to which is suitably secured, as by a nut 24, a pulley 25, having a driving surface 26 of substantially V cross section.

A cylindrical boss 27 having a flat segment 28, and a transversely arranged lug or table 29 are formed at the forward upper end of the cover 21.

An electrical machine in the form of a generator 30, is provided at its lower end with a downwardly extending cylindrical stud 31 having a flat segment 32 which is slidably mounted in the boss 27 for supporting the generator.

A cooling fan 33 and a driven pulley 34 of V cross section are suitably secured, as by bolts 35, to the forward end of the generator shaft 36. A belt 37 of V cross section, and preferably formed of a flexible fabric or of leather, is passed around the pulleys 25 and 34 for driving the shaft 36 and its connected parts from the crank shaft 17.

A spiral spring 38 is inserted in the hollow portion 39 of the stud 31 with its lower end resting on the table 29, and preferably so formed as to require a greater weight than that of all the parts supported on it, viz: the generator 30, its shaft 36, pulley 34 and cooling fan 33 and connecting parts, all combined to fully compress it.

Therefore it will be seen that these parts have a buoyant mounting on the crank case, *i. e.* the spring is at all times normally tending to elevate the supported parts with the result that any slack in the driving belt 37 will be automatically taken up and the driving and driven pulleys 25 and 34 maintained in a predetermined driving relation.

I prefer while assembling in position the supported parts 30, 33, 34 and 36, to temporarily apply a load greater than their combined weight, thus increasing the compression of the spring 38, and while having the spring so compressed, I mount and secure the belt 37 in position, and before the excess load is removed, I insert in the transversely extending opening 40 in the boss 27, a tapered locking plug 41 and draw it up tightly by means of a threaded bolt 42. It will therefore be understood that if the locking device 40, 41 and 42 becomes loose for any reason, the spring support will tend to elevate the generator and fan unit and increase the tension on the belt 37. On the other hand, as the belt becomes stretched or worn, all that is required for increasing its tension is to merely release the locking device.

Here we have an automatic device for maintaining a predetermined driving relation between the driving and driven pulleys without the use of an unsatisfactory idler pulley. Also if desired the parts may be locked in a predetermined driving relation independently of the spring support.

While I have described and will specifically claim what I deem to be a preferred embodiment of my invention, it will be obvious to those skilled in the art that various modifications and changes may be made without departing from the spirit and scope hereof.

Having thus described my invention, what I claim and desire to secure by Letters Patent is:

1. In an internal combustion engine, the combination with a crank case, and a shaft mounted therein, of a device to be driven yieldingly mounted on said crank case, means for securing said device in driving position, and a driving connection between said device and said shaft.

2. In an internal combustion engine, the combination with a crank case, and a shaft mounted therein, of a device yieldingly mounted in relation to said crank case, means for securing said device in driving position, and a driving belt connecting said shaft and said device.

3. In an internal combustion engine, the combination with a crank case, and a shaft mounted therein, of an electrical machine yieldingly mounted on said crank case, means for securing said device in driving position, and means for driving said machine from said shaft.

4. In an internal combustion engine, the combination with a crank case, a shaft and gearing mounted therein, and a cover for said gearing, of a device yieldingly mounted on said cover, and means for driving said device from said shaft.

5. In an internal combustion engine, the combination with a crank case and a shaft mounted therein, of a fan yieldingly supported on said crank case, means for securing said fan in driving position, and means for driving said fan from said shaft.

6. In an internal combustion engine, the combination with a crank case, and a rotatable shaft mounted therein, of an electrical machine and a fan yieldingly mounted on said crank case, means for setting said machine and fan in driving position, and common means for driving said fan and machine from said shaft.

7. In an internal combustion engine, the combination with a crank case, and a rotatable shaft mounted therein, of an electrical machine yieldingly mounted on said crank case, a fan mounted on said machine, means for securing said machine in driving position, and means for driving said fan and machine from said shaft.

8. In an internal combustion engine, the combination with a crank case, and a rotatable shaft mounted therein, of an electrical machine yieldingly mounted on said case and having a rotatable shaft, means for securing said machine in driving position, a fan and a driven pulley secured to said second shaft, and a belt for connecting said shafts.

9. In an internal combustion engine, the combination with a device to be driven therefrom, of spring means for supporting said device, said means normally tending to elevate said device, and means for maintaining said device in a predetermined position.

10. In an internal combustion engine, the combination with a device having a flexible driving connection therewith, of a mounting for said device on said engine, normally tending to remove any play in said driving connection, and means for maintaining said device in a predetermined position.

11. In combination, a driving element, a driven element and means connecting the two, said means normally tending to yieldingly maintain said parts in a predetermined relation, and means independent of said first means for fixing the relation of the two, independently of said yielding means.

12. In an internal combustion engine, the combination with a driving shaft, and a device to be driven, of means for forming a buoyant mounting of said device on said engine, and adjustable means for maintaining a predetermined relation between said shaft and said device independently of said first means.

13. In an internal combustion engine, an accessory mounting, comprising a cylindrical boss, a trunnion adapted to be mounted therein, and having a substantially flat segment, spring means for supporting said trunnion, of a tapered retaining plug arranged in said boss and adapted to coöperate with segment of said trunnion for locking said trunnion and boss.

14. In an internal combustion engine, an accessory mounting, comprising a cylindrical boss, a trunnion adapted to be mounted therein, spring means for supporting said trunnion and adjustable means for locking said trunnion in a predetermined relation to said boss.

In testimony whereof I affix my signature.

CHARLES R. SHORT.